July 1, 1952  J. KUCEWICZ  2,601,839
FISHING POLE SIGNAL
Filed June 24, 1950
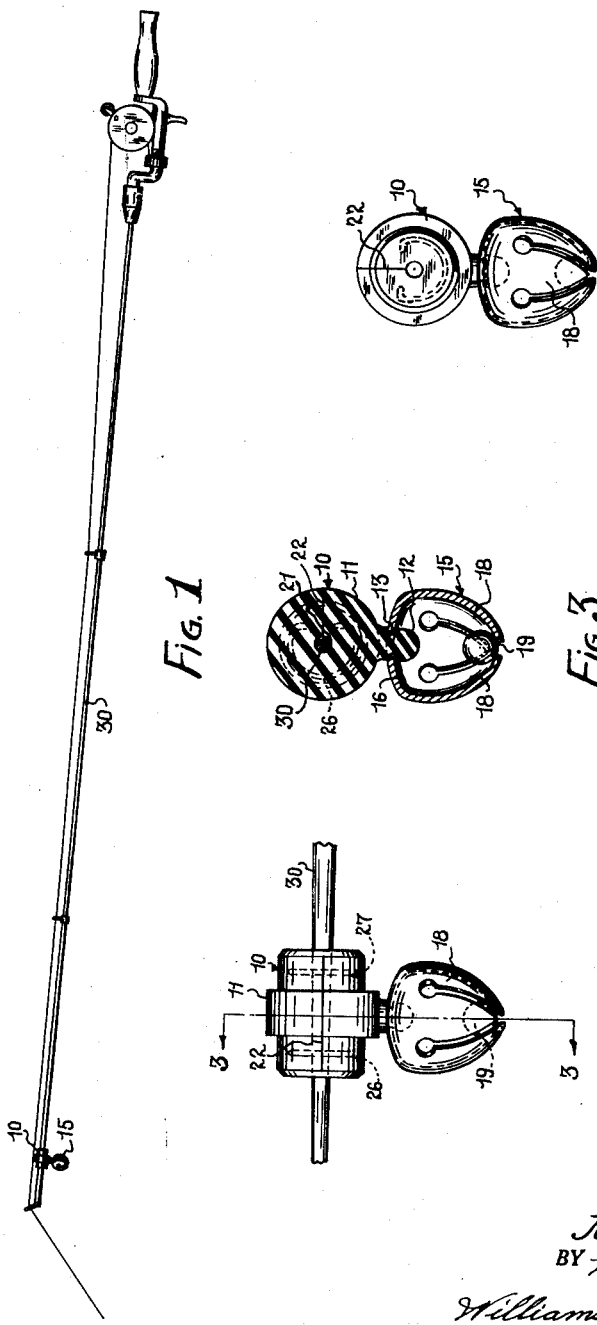
INVENTOR.
JOSEPH KUCEWICZ
BY Hudson, Boughton,
Williams, David & Hoffmann.
ATTORNEYS Patented July 1, 1952

2,601,839

UNITED STATES PATENT OFFICE 2,601,839

FISHING POLE SIGNAL

Joseph Kucewicz, Cleveland, Ohio

Application June 24, 1950, Serial No. 170,141

3 Claims. (Cl. 116—114)

The present invention relates to a signal device which may be readily attached to and detached from a fishing pole and the like to provide a signal to indicate fish bites, particularly when the fishing pole or the like is fixedly supported.

The principal object of the present invention is to provide a new and improved signal device which can be readily secured to a fishing pole or the like and which produces an audible signal when the pole is jerked, as by a fish bite.

Another object of the present invention is to provide a new and improved signal device for fishing poles and the like, which device comprises a resilient body having a signal device attached thereto and a separation therein, the confronting surfaces at the separation normally yieldingly engaging one another or substantially so, and adapted to be separated by deforming the body to receive a section of a fishing pole between the separated surfaces whereby the pole is gripped by the inherent resiliency of the body when the body is released.

Still another object of the invention is to provide a new and improved signal device which can be readily attached to and detached from a fishing pole and the like and which is compact and inexpensive to manufacture.

The invention resides in certain constructions and combinations and arrangements of parts and further objects and advantages will be apparent to those skilled in the art to which it relates from the following description of preferred embodiments described with reference to the accompanying drawings forming a part of this specification, in which:

Fig. 1 is a side elevational view of a fishing pole having a signal device embodying the present invention attached thereto;

Fig. 2 is a fragmentary view of the signal device and pole shown in Fig. 1 but on a larger scale;

Fig. 3 is a sectional view taken on line 3—3 of Fig. 2;

Fig. 4 is a fragmentary end view of the device shown in Fig. 3 illustrating the manner in which the device is applied to and removed from the fishing pole; and Fig. 5 is an elevational end view of another form of signal device.

The invention contemplates the provision of a resilient body, such as rubber or like material, preferably having an opening therethrough for receiving a segment of a fishing pole therein and which body is separated in at least one plane parallel to and entering one side of the opening so that the confronting surfaces in the separation can be spread by temporarily deforming the body to receive a segment of a fishing pole into the opening, the body having inherent resiliency for gripping the pole when the body is no longer deformed. In the preferred form of the invention the body is made of rubber and has one or more spring members embedded therein for assisting in urging the confronting surfaces of the body separation toward one another to insure a tight grip of the body to the pole. One side of the body is provided with a boss to which a suitable signal is attached, such as a bell, and which is responsive to sudden movements of the body to produce a signal.

Referring now to the drawings, a signal device is shown comprising a cylindrical body 10 preferably formed of a suitable resilient material, such as rubber, either natural or so-called synthetic. Preferably, the body has a peripheral band formation 11 which has a boss 12 projecting radially therefrom and which boss has a groove 13 therearound and spaced from the end to provide a neck and head formation at the outer portion of the boss. A bell is attached to the boss 12, which bell may be of any suitable type, and as shown is of the well known construction comprising a shell like member 15 having an opening 16 at one end thereof and being slotted to form segments 18 which inclose a suitable ball 19 which strikes the shell when the latter is moved suddenly to produce a ringing sound. The diameter of the opening 16 is substantially the same as the diameter of the neck portion of the boss at the grove 13 whereby the sides of the groove 13 hold the shell to the boss 12. The bell is attached to the body by forcibly inserting the outer end or head of the boss through the hole 16, which head, being of resilient material is deformable so that it can be inserted through the smaller opening. Preferably, the end of the boss is rounded to facilitate its insertion into the opening.

The body 10 has an axial opening 21 therethrough, which opening may normally be slightly less in diameter than the section of the fishing pole to which the body is to be attached, and the body is cut longitudinally and radially along the plane of line 22 which cut provides confronting surfaces 23, 24 which are in engagement when the device is unused, although they normally could be slightly separated, if desired. Preferably, in addition to the inherent resiliency of the material forming the body tending to maintain the surfaces 23, 24 in contact, a pair of C-shaped spring members 26, 27 are embedded in the body 10 and tend to urge the surfaces toward one another. Alternatively, the springs could be secured to the exterior of the body to act in the same manner as described. The spring members could be omitted in some instances provided sufficient resiliency is obtained by the material of the body.

In the preferred form of the invention, the cut 22 is made in a plane which is at right angles to the axis of the boss 12, as seen in Fig. 3. Alternatively, the cut could be provided at any other desired angle relative to the axis of the boss 12, such as at 180° as shown in the signal device shown in Fig. 5.

To apply the signal device to a fishing pole, one of which is shown at 30, the body 10 is deformed or spread to separate the surfaces 23, 24 as shown in Fig. 4, and thus separated, the device may be placed over a section of the pole 30 with the pole received in the axial opening 21, and upon releasing the body 10, the inherent resiliency of the body together with the springs 26, 27 urge the body back to its normal shape with the surfaces 23, 24 in engagement, or substantially so, which causes the segment of the pole 30 to be firmly gripped in the opening 21.

The device may be readily disconnected from the pole by spreading the body to separate surfaces 23, 24 to release the pole from the opening 21. The preferred construction having the slot or cut 22 approximately 90° from the boss 12 is easier for most people to attach to and detach from the fishing pole as the bell 15 serves to a limited extent as a handle or hand grip by which the body may be spread.

It will be apparent that by placing the device adjacent to the outer end of the fishing pole, slight jerks on the pole due to fish bites actuate the bell to sound a warning to the fisherman who may then take up the pole and attend the line. The device is inexpensive to manufacture, compact and is adaptable to various fishing poles and the like without the use of separate attaching means or special constructions of the fishing poles. By forming the body of rubber or the like, it is not appreciably affected by water and will last indefinitely under expected conditions.

From the foregoing it will be apparent that the objects of the invention heretofore enumerated and others have been accomplished and that there has been provided a novel and improved signal device easily attached to and detached from fishing poles, and the like, by hand and without the use of tools and it is to be understood that the invention is not limited to the particular construction shown and described and it is my intention to cover hereby all adaptations, modifications and uses thereof which come within the practice of those skilled in the art to which the invention relates and within the scope of the appended claims.

Having thus described my invention, I claim:

1. An article of manufacture comprising a cylindrical, resilient rubber-like body having a plane of separation extending inwardly from one side thereof and extending lengthwise of said body, said body adapted to be yieldingly spread at said separation for receiving a section of a pole therebetween, a resilient boss projecting from one side of said body, said boss having an intermediate portion of reduced diameter, and a signal device supported by the body, said device including a wall having an opening to receive said reduced portion of said boss and through which said boss proper may pass when compressed.

2. An article of manufacture comprising a resilient rubber-like cylindrical body having an axial opening therethrough and a plane of separation extending inwardly from one side and lengthwise thereof, the body adapted to be yieldingly spread at said separation for receiving a section of a pole therebetween, a resilient boss extending from said body at approximately 90° to said plane of separation, and a signal device supported by the body, said device including a wall having an opening to receive said reduced portion of said boss and through which said boss proper may pass when compressed.

3. An article of manufacture comprising a flexible cylindrical body having a plane of separation extending radially inwardly from one side and longitudinally thereof, the confronting surfaces at said separation adapted to yieldingly separate for receiving a section of a pole therebetween, and a C-shape spring embedded entirely within said body and arranged to urge said surfaces toward one another, and a signal device attached to said body.

JOSEPH KUCEWICZ.

REFERENCES CITED

The following references are of record in the file of this patent:

UNITED STATES PATENTS

| Number | Name | Date |
|---|---|---|
| 2,002,001 | Beard | May 21, 1935 |

FOREIGN PATENTS

| Number | Country | Date |
|---|---|---|
| 721,297 | France | Dec. 12, 1931 |